June 2, 1964

J. E. FOOTE 3,135,649

METHOD AND APPARATUS FOR FORMING
INDICIA ON MOLDED PULP ARTICLES

Filed Dec. 4, 1961

INVENTOR
JAMES E. FOOTE

BY KARL W. FOCKS
ATTORNEY

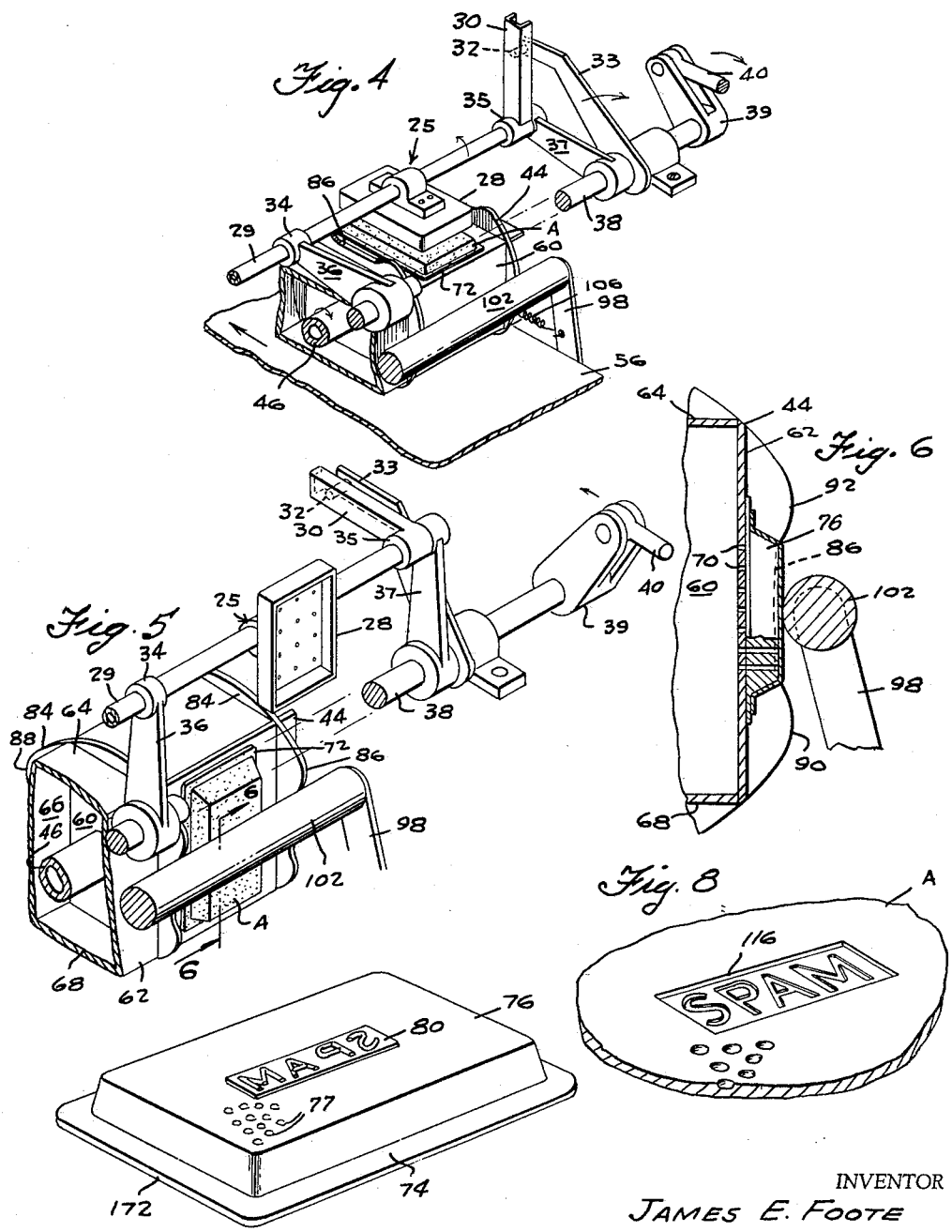

United States Patent Office 3,135,649
Patented June 2, 1964

3,135,649
METHOD AND APPARATUS FOR FORMING
INDICIA ON MOLDED PULP ARTICLES
James E. Foote, Westport, Conn., assignor to Diamond National Corporation, New York, N.Y., a corporation of Delaware
Filed Dec. 4, 1961, Ser. No. 156,589
9 Claims. (Cl. 162—117)

This invention relates generally to the production of molded pulp articles, and particularly to the novel method and apparatus for transferring continuously produced, molded pulp articles and simultaneously imprinting or forming indicia on such articles as they are being transferred to conveying means.

Imprinting indicia on the surface of molded pulp articles formed on suction mold wire-faced dies has generally been accomplished by incorporating the indicia pattern on the forming wires of the suction mold dies. The wires, although satisfactory for the purpose of forming the articles, might be described as being "relatively soft" and continuous use thereof during production often results in the mechanical deterioration of the indicia forming means on the forming wires resulting in poor quality of imprinting on the articles being produced.

A primary object of the present invention is to overcome the shortcomings of the prior art and to provide a novel method and apparatus for producing an improved quality of embossed or imprinted indicia on continuously produced and transferred molded pulp articles.

Further objects of the present invention are to provide in a system for continuously producing molded pulp articles, a novel method and apparatus which incorporates in the system a relatively permanent imprinting die wherein the quality of indicia formed on the articles can be maintained; wherein the embossing or imprinting means is readily incorporated in existing apparatus without appreciable expense or modification of the apparatus; and wherein the imprinting or embossing means is readily maintained and is satisfactory and practical for the purpose intended.

Other objects and the nature and advantages of the instant invention will be apparent from the following description taken in conjunction with the accompanying drawings, wherein:

FIG. 4 is a schematic view in perspective showing the position of the cooperating parts and production step wherein an article is received on a transfer head prior to the step of imprinting or embossing the same, and showing the relative position of conveyer means for transporting an article after imprinting has been formed thereon;

FIG. 5 is a view similar to FIG. 4, showing an article on the transfer head being subjected to imprinting or embossing pressure subsequent to disposition on conveyer means, not shown;

FIG. 6 is an enlarged fragmentary section taken substantially on the plane of line 6—6 of FIG. 5, showing the manner in which positive pressure is applied to an article disposed on the transfer or imprinting die of the transfer head;

FIG. 7 is an enlarged perspective view of an embossing or imprinting die removed from the transfer head of the apparatus; and FIG. 8 is an enlarged perspective view of a fragmentary portion of a finished article having imprinted or embossed thereon indicia produced by the novel method and apparatus.

Figure 1:
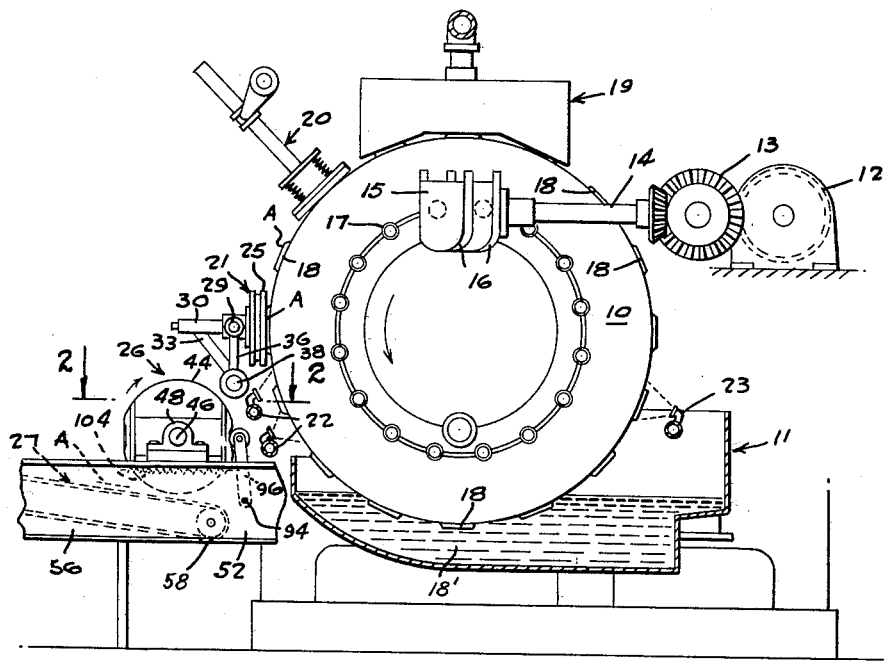
FIG. 1 is a schematic view in side elevation showing a pulp molding apparatus illustrating the system in which the novel method and apparatus is incorporated.

Referring to FIG. 1 of the drawings, a forming wheel or polyfaceted molding drum 10 is mounted on a horizontal axis of rotation for step-by-step rotation, as indicated by the direction arrow thereon, so that the lower end thereof dips into an aqueous pulp solution within a tank 11.

A motor 12 drives through a transmission 13 and drive shaft 14, a step-by-step transmission 15, which includes camming threads 16 and cooperating elements 17, so that each forming facet 18 of the polyfaceted forming wheel or drum 10 will be brought to a momentary rest position at a forming station 18' within the aqueous pulp solution in the tank 11 wherein a layer or pulp preform will be deposited on the lowermost facet, or in a steam chamber station 19, or pressure head station 20, or molded pulp article delivery station 21.

Each facet 18 of the forming wheel or molding drum 10 may be cleaned by suitable water sprays 22 as the drum is rotated so that the screen faced forming molds will be presented to the pulp slurry within the tank 11 in a clean condition, and the molded pulp article, produced thereon by suction, will be properly formed or deposited as excess water is drawn through the foraminous mold or die and the pulp fibers of the slurry are deposited on the foraminous mold or die to form the desired article preform.

Continued rotation of the forming wheel or drum 10 will position the molded pulp article deposited on the forming facets 18 in the path of a second spray 23 to primarily clean the same, if desired. Further rotation of the wheel or drum will position the primarily formed article preforms on facets 18 in a location within the steam chamber station 19 for a steam treatment prior to the article being brought into position at the pressure head station 20 where a pressure head operating in timed relation to the other parts of the apparatus primarily forms the molded pulp article.

Thereafter, the article preform, which is still positioned on the molding drum facets 18, will be oriented adjacent a delivery head 25 which will effect transfer of the molded article preform to a transfer head and imprinting assembly, indicated generally at 26. The assembly 26 will, in turn, deliver the article onto conveyor means indicated generally at 27. Each article, as it is transported from the delivery head 25 to the transfer head assembly 26, is disposed with the "screen side" of the article facing upwardly. The "screen side" is that side of the article which, under close observation, will reveal the imprint made by the wire elements of the suction mold die. The conveyor means 27 will deliver the formed articles with the "screen side" facing upwardly to a conventional drying chamber means or the like, not shown.

The delivery head 25, transfer head-and-imprint assembly 26 in relation to the conveyor means 27, and other cooperating structure are most clearly seen in FIGS. 2–6.

Referring particularly to FIGS. 4 and 5, the delivery head 25 comprises a removing or delivery die 28 fixed on and communicating with the interior of a hollow shaft 29 which is keyed to a channeled lever 30. The channeled lever 30 engages over a fixed camming or pivot pin 32 to afford the comparative movement shown in FIGS. 4 and 5, the pivot pin 32 being supported on a fixed bracket 33 suitably mounted on the apparatus.

The shaft 29 is journaled for rotation at 34 and 35 in levers 36 and 37, respectively, which are fixed to a transverse delivery head operating shaft 38 terminally connected at one end to a bifurcated lever 39 pivotally connected at the outer end thereof to one end of an elongated force transmitting rod 40. The other end of the rod 40 is connected to suitable drive mechanism (not shown) driven in timed relation with the movement of the forming wheel or drum 10.

Oscillatory movement will be provided to the lever 39 through the rod 40 and substantially 90° oscillation will be provided to the delivery die 28 wherein the die will move from the vertical position shown in FIG. 5 to the horizontal position shown in FIG. 4 due to the cooperating relationship of the channeled lever 30 and camming pin 32.

When the delivery die 28 is disposed in the vertical position of FIGS. 1 and 5, the delivery die will be parallel and in juxtaposed relation with one of the mold facets 18 on the molding drum 10. It will be noted that the shaft 29 is hollow and communicates with the perforated face of the delivery die 28, and thus through the conventional use of combined suction and pressure in the shaft 29, the articles or preforms A will be removed from a mold facet 18 and deposited on the delivery die 28 for subsequent removal therefrom onto a receiving face of a rotary drum 44 of the transfer-and-imprinting assembly 26; this structure to subsequently be described in detail.

Figure 2:
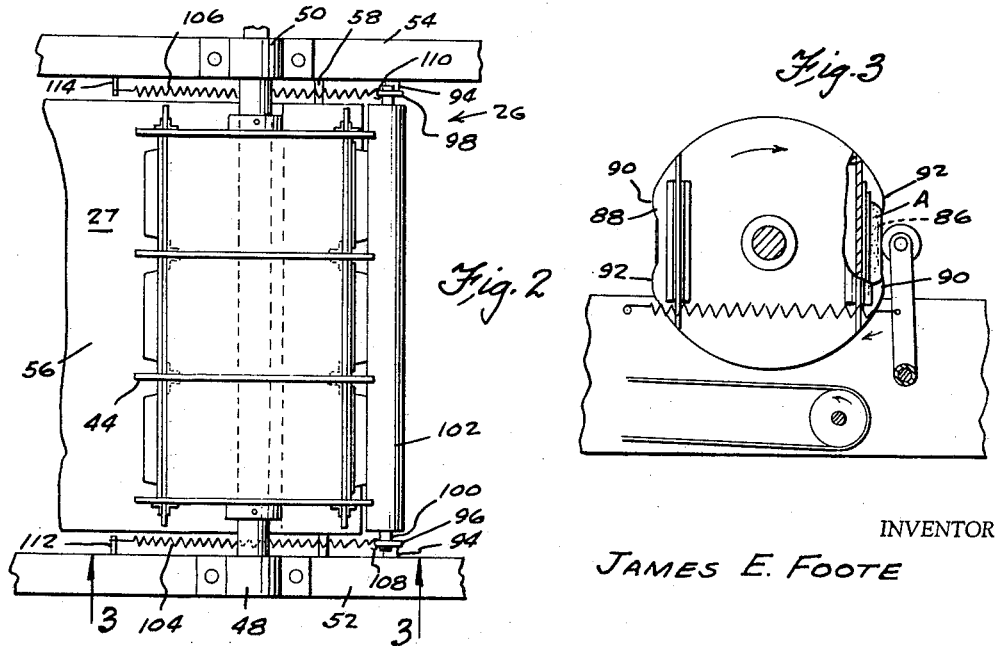
FIG. 2 is an enlarged, plan view taken substantially on the plane of line 2—2 of FIG. 1, showing novel transfer-and-imprinting apparatus.
Figure 3:
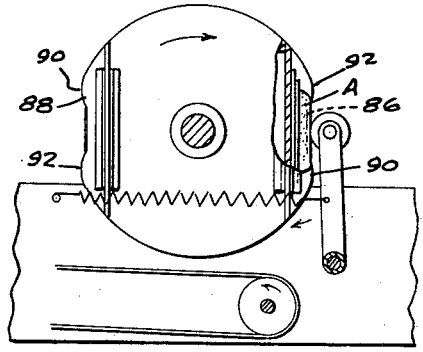
FIG. 3 is a vertical section taken substantially on the plane of line 3—3 of FIG. 2, with portions broken away for the purposes of clarity.

The rotary drum 44 is supported on a horizontal axis of rotation by a hollow shaft 46 which is terminally journaled at opposite ends in suitable bearings 48 and 50, respectively, mounted on the upper edge of spaced, parallel support members 52 and 54, respectively; see FIG. 2. The drum 44 will be rotatable on the shaft 46 in timed step-by-step 180° cycles of rotation with respect to the oscillatory movement of the delivery die 28. The hollow shaft 46 will conventionally communicate with suction and pressure for receiving an article A from the delivery die 28 and subsequently depositing it onto the conveyor means 27.

The conveyor means 27 can be of any suitable character and is disclosed as an endless belt 56, supported at one end on a transversely disposed support roller and shaft 58 underlying the drum 44 and journaled in the support members 52 and 54, the support for the other end of the conveyer and driving means not being shown.

The drum 44 comprises a longitudinally disposed chamber 60 formed by rectangularly disposed, longitudinally extending plates 62, 64, 66 and 68, the plates 62 and 64 comprising receiving faces upon which the articles A will be received. The chamber 60 communicates with the hollow shaft 46 and the plates 62 and 66 are suitably perforated at 70, see FIG. 6, for communicating the outer surfaces of the plates 62 and 66 with the pressures within the chamber 60. Suitably secured on the outer surface of the plates 62 and 66 are article-receiving dies 72 which will align with the delivery dies 28 when they are disposed in the positions shown in FIG. 4. The receiving or transfer dies 72 include a base plate 74 and body portion 76 conforming to the interior dimensions of the articles A; in this exemplary embodiment the articles comprising conventional meat trays, for example. The base plate 74 and body portion 76 will be suitably apertured, as indicated at 77, and providing passage means, for communicating with the chamber 60 through the apertures 70. The body portion 76 has secured on the outer surface thereof a suitably raised imprinting or embossing plate means 80 for forming an impression on the inner surface of the articles A, these articles being readily embossed by the imprinting means, inasmuch as they will have not been subjected to drying prior to the imprinting thereon. Suction and pressure will be controlled within the shaft 46 for the purpose of receiving articles from the delivery dies 28 and depositing them "screen side" up on the endless conveyer 56.

The drum 44 includes a plurality of transversely disposed cam plates 84 normal to the axis of rotation thereof and having a substantially circular peripheral configuration and include on the periphery thereof diametrically disposed, flat, tangentially extending undercut groove portions 86 and 88. The undercut groove portions 86 and 88 have curved entrance and exit portions 90 and 92, respectively. The flat portions 86 and 88 will extend in parallel relation to and slightly below a plane passing through the outer surface of the embossing means 80 on the body portion 76 of the transfer die 72.

Pivotally mounted on opposed portions of the support members 52 and 54, as indicated at 94 in FIG. 1, are vertically extending support levers 96 and 98 which have journaled at the upper ends thereof a support shaft 100 upon which is mounted an impression or pressure roll 102 which will ride on the peripheral edge of the cam plates 84 and follow the contour thereof. The levers 96 and 98 are biased toward the peripheral edges of the cam plates by tension springs 104 and 106, respectively. The springs are terminally anchored at 108 and 110 to intermediate portions of the levers 96 and 98, respectively, and the other ends of the springs being anchored on pins 112 and 114, respectively, extending inwardly from opposed inner surface portions of the support members 52 and 54.

As the hollow shaft 46 is rotated in the previously mentioned timed relationship step-by-step between the positions shown in FIGS. 4 and 5, the impression roller 102, following the periphery of the cam plates 84, will engage the curved entrance portion 90 into the undercut groove portions 86 and 88 and accordingly roll across the outer or back surface portions of the articles 80. This will result in the forming of indicia 116 on the inner or "forming wire" surface of the articles without any appreciable modification of a drum 44 or transfer dies 28.

The transfer dies 72, it will be observed, can be much more readily produced and tooled than suction mold wire dies, especially where indicia imprinting means is to be formed on the mold wires. The transfer dies 72 lend themselves to interchangeability to permit different articles to have different manufacturers', packers' or product indicia applied to the continuously produced articles. Further, the nature of the imprinting means lends itself to the uniform production of high quality impressions on the finished articles, which will remain considerably sharper and more uniform than those produced by impressions formed on suction mold wires.

Additionally, in view of the fact that the articles A are relatively damp or wet when deposited on the conveying means, since the impressions or imprints are applied just before the articles are deposited on the conveyer to be moved to drying ovens, etc., there is relatively little opportunity for the imprint made on the articles A to become marred or damaged due to mechanical handling of the articles by the apparatus. Obviously, when the imprint is made on the articles at the time the preform is initially deposited on a suction mold facet 18, and the article is handled at the delivery dies 28 or is transferred to the transfer dies 72, the possibility of damage to the suction mold imprint is increased.

It will be obvious to those skilled in the art that various changes may be made without departing from the spirit of the invention and therefore the invention is not limited to what is shown in the drawings and described in the specification but only as indicated in the appended claims.

What is claimed is:

1. The method of imprinting indicia on continuously produced molded pulp article preforms comprising the steps of:

(a) forming an article preform on a mold;
   (b) delivering said article preform to a preform receiving die having an indicia imprinting portion thereon;
   (c) moving said article preform from a receiving position to a depositing position while applying imprinting pressure to said preform while on said receiving die and forming indicia on said article preform prior to removing said preform from said receiving die.

2. The method of claim 1 wherein:
(d) rotating said receiving die between said receiving and depositing positions, and applying imprinting pressure to said preform by rolling contact of pressure means in engagement with said preform on said receiving die.

3. Article transfer-and-imprinting apparatus for use with apparatus for continuously producing pulp article preforms comprising rotatably supported drum means having an article preform receiving position and article preform discharge position, article preform receiving die means on at least one portion of said drum means, said drum including article-retaining means associated with said preform receiving die means for retaining a preform thereon, said die means including an indicia imprinting portion thereon, and pressure applying means normally urged toward the axis of rotation of said drum for engaging a preform on said indicia imprinting portion for applying pressure thereto as said drum is rotated from an article preform receiving position to said article discharge position.

4. Article transfer-and-imprinting apparatus, as set forth in claim 3, in which said article retaining means comprises communicating passage means between said drum and die means for communication with control pressures for aiding in the retention and transfer of an article preform with respect to said die means.

5. Article transfer-and-imprinting apparatus, as set forth in claim 3, in which said drum means is mounted on a fixed axis of rotation, said pressure applying means comprising a roller element mounted on an axis of rotation parallel to said axis of rotation of said drum means and having rolling engagement over said indicia imprinting portion.

6. Article transfer-and-imprinting apparatus, as set forth in claim 5, including biasing means operatively connected to and urging said roller element toward said drum means.

7. Article transfer-and-imprinting means, as set forth in claim 5, in which said drum means includes a peripheral cam track portion disposed in the path of travel of said roller element and normal to the axis of rotation of said drum means, said cam track portion being spaced from and oriented with respect to said indicia imprinting portion for permitting a predetermined pressure to be applied by said roller element.

8. Article transfer-and-imprinting apparatus, as set forth in claim 7, in which said article-retaining means comprises communicating passage means between said drum and die means for communication with control pressures for aiding in the retention and transfer of an article preform with respect to said die means.

9. Article transfer-and-imprinting apparatus, as set forth in claim 8, including biasing means operatively connected to and urging said roller element toward said drum means.

References Cited in the file of this patent
UNITED STATES PATENTS

| | | |
|---|---|---|
| 1,808,536 | Fisk | June 2, 1931 |
| 1,872,207 | Witham | Aug. 15, 1932 |
| 2,068,707 | Reardon | Jan. 26, 1937 |
| 2,077,790 | Hakogi | Apr. 20, 1937 |
| 2,124,711 | Rowell | July 26, 1938 |
| 2,201,302 | Rowe | May 21, 1940 |
| 3,017,829 | Brown | Jan. 23, 1962 |